Figure 1:
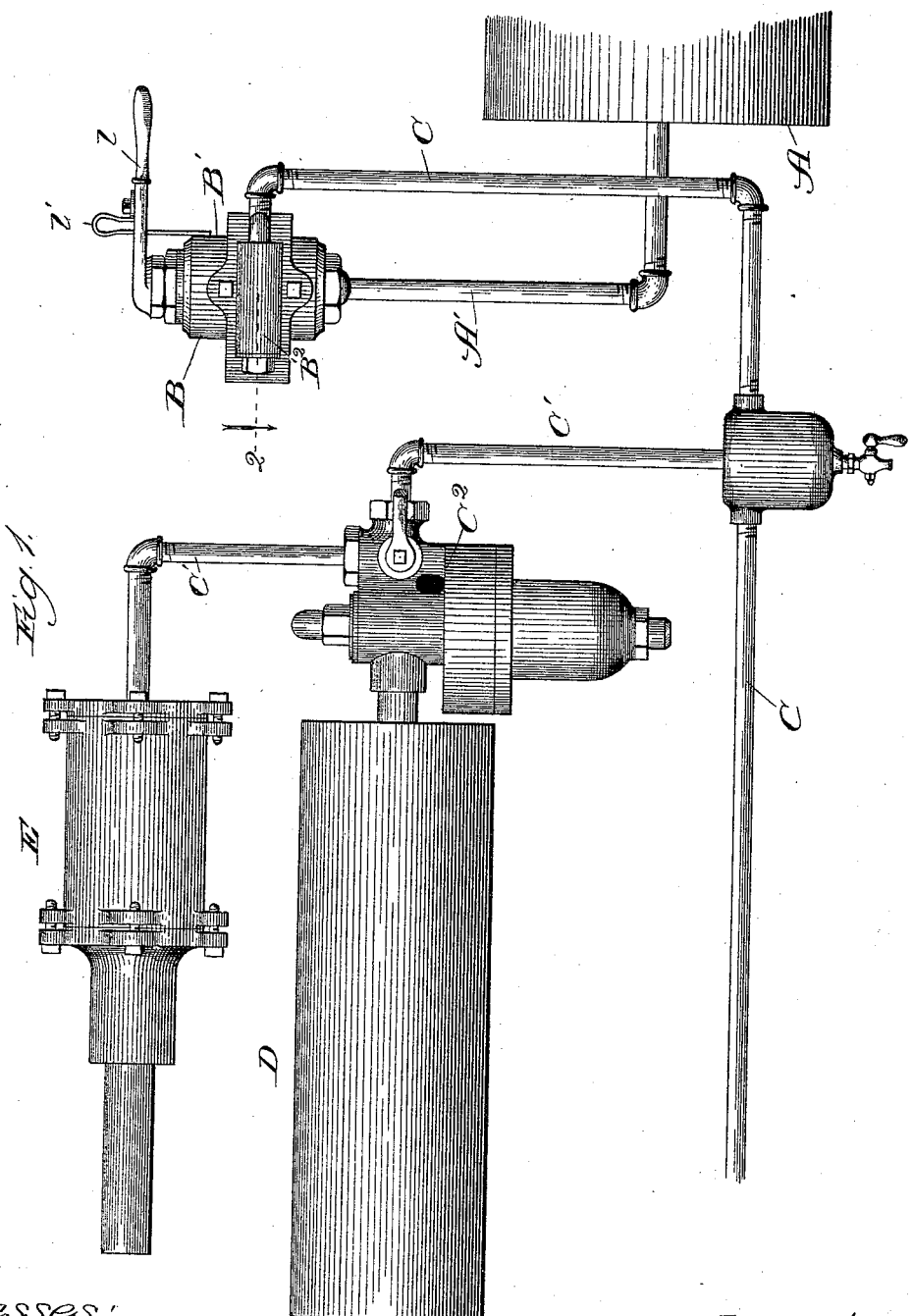

(No Model.) 2 Sheets—Sheet 1.

H. R. MASON.
BRAKE VALVE FOR AIR BRAKES.

No. 450,332. Patented Apr. 14, 1891.

Witnesses:

Inventor:
Harry R. Mason
By Dyrenforth & Dyrenforth
Attys.

(No Model.)　　　　　　　　　　　　　　　　2 Sheets—Sheet 2.
H. R. MASON.
BRAKE VALVE FOR AIR BRAKES.

No. 450,332.　　　　　　　　　Patented Apr. 14, 1891.

Witnesses:　　　　　　　　　　　　　　Inventor:
　　　　　　　　　　　　　　　　　　　Harry R. Mason,

UNITED STATES PATENT OFFICE.

HARRY R. MASON, OF CHICAGO, ILLINOIS.

BRAKE-VALVE FOR AIR-BRAKES.

SPECIFICATION forming part of Letters Patent No. 450,332, dated April 14, 1891.

Application filed July 31, 1890. Serial No. 360,534. (No model.)

*To all whom it may concern:*

Be it known that I, HARRY R. MASON, a citizen of the United States, residing at Chicago, in the county of Cook and State of Illinois, have invented a new and useful Improvement in Brake-Valves for Air-Brakes, of which the following is a specification.

My invention relates to an improvement in a certain valve device employed in connection with air-brakes for railway-cars, particularly of the class in general use, wherein the brakes are applied automatically by reducing the pressure of air in the train-pipe and released by increasing the air-pressure therein.

The mechanism for generating and controlling the air-pressure in the class of air-brakes above defined comprises, generally stated, an air-pump, a "main reservoir" connected with the pump and in which the pressure is stored, all located upon the locomotive, and a "train-pipe" extending from the main reservoir to "auxiliary reservoirs" and "brake-cylinders" on each car of the train, suitable shut-off cocks and couplings being provided along the train-pipe between cars. An operating-valve, called the "engineer's brake-valve," is interposed in the train-pipe upon the locomotive, by means of which the flow of air to the train-pipe from the main reservoir for releasing the brakes and the escape of air from the train-pipe for applying the brakes is regulated, and it is to improvement in this engineer's brake-valve that my invention particularly relates.

As hitherto constructed, the brake-valve in question is defective, for the reason that, while the brakes are held released under pressure from the main reservoir, the accidental parting of a coupling between the cars or sudden breakage of or undue leakage in the train-pipe or attendant parts from any unforeseen cause applies the brakes by permitting the rapid escape of air from the main reservoir and train-pipe, which, if not checked in time by the engineer, quickly exhausts the pressure in the main reservoir and requires the renewal of the pressure-supply by means of the pumps before the brakes can be again released. This necessarily occasions delay before the train can be again started, and has in the past been the cause of serious accidents.

My object is to overcome the objection above set forth to the engineer's brake-valves as hitherto constructed by providing such a valve device which will operate automatically to check the flow of air from the main reservoir to the train-pipe when the pressure in the latter is suddenly reduced through any undue cause.

Figure 2:
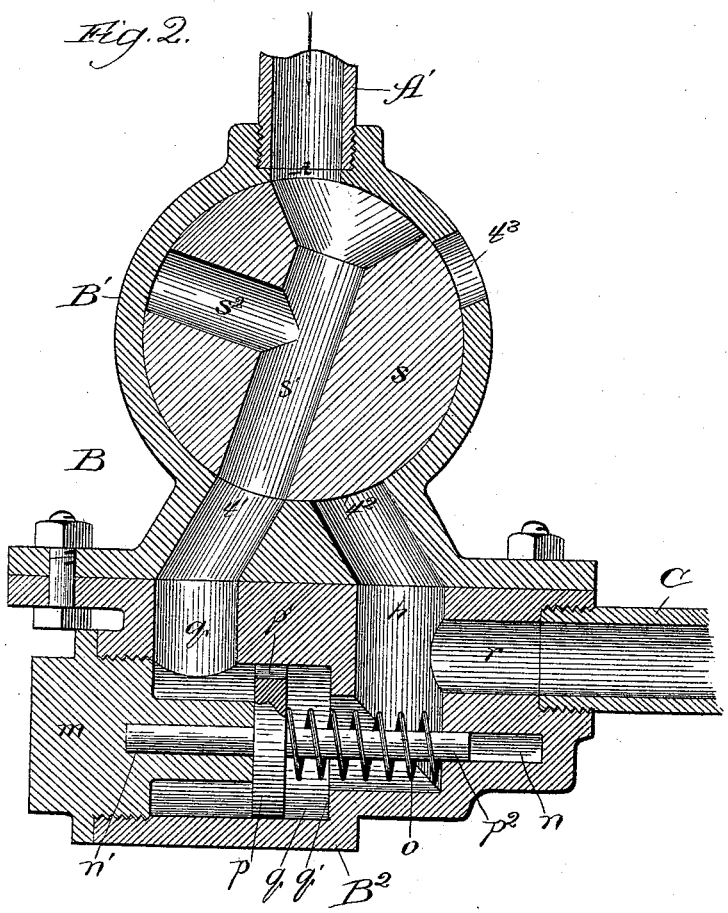

In the drawings, Figure 1 is a view in the nature of a diagram, showing my improvement in elevation as applied to an air-brake system; and Fig. 2, an enlarged section taken on the line 2 of Fig. 1 and viewed in the direction of the arrow.

A denotes the main reservoir for compressed air, which is connected with a suitable air-pump, (not shown;) A', a pipe leading from the main reservoir to the engineer's brake-valve device B; C, the train-pipe leading from the valve B; C', a branch of the train-pipe in which triple-valve mechanism $C^2$ (of the well-known construction) is interposed and which communicates with an auxiliary reservoir D and brake-cylinder E.

The shell of the brake-valve device B is for convenience formed in two parts B' $B^2$, which are bolted together, as shown, and constitute each a valve in itself, as hereinafter described. In the part B', which is the engineer's brake-valve proper, are the port $t$, at which the pipe A' is connected, ports $t'$ and $t^2$, which lead, respectively, into an indirect or supplemental passage $q$ and direct passage $h$, and port $t^3$, leading to the outer air, all of the said ports being in the relative positions shown. The rotary valve-plug $s$ is provided with the diagonal passage $s'$ and branch passage $s^2$, and the passage $s'$ is widened at the mouth by flaring in the horizontal plane to an extent which permits the plug to be turned to move the opposite end of the passage $s'$ from one of the ports $t'$ or $t^2$ to the other without shutting off its communication with the port $t$. In the part $B^2$ is an outlet $r$, to which the passages $h$ and $q$ lead and which open into the train-pipe C. The passage $q$ in the part $B^2$ is provided with an auxiliary valve $p$, held normally open by a spring $o$. The valve $p$, as shown, is in the form of a piston provided at its periphery with a small passage $p'$ and mounted upon a rod $p^2$, which extends from opposite sides thereof and moves at one end in a guide-socket $n$ in the shell and at the opposite end in a guide-socket $n'$ in a removable screw-plug $m$, extending into the shell. The valve-seat $q'$ is formed by a narrowing of the passage $q$, and the spring $o$ operates normally to press the valve away from its seat against the end of the plug $m$. The plug $s$ is controlled through the medium of a suitable handle $l$.

In operation the brakes when set are released by turning the plug $s$ to bring the passage $s'$ coincident with the port $t^2$, which causes the air to flow from the main reservoir through a direct channel $h\,r$ to the train-pipe. When the brakes are released and an equilibrium of the air-pressure is established throughout the system, the plug is turned to bring its passage $s'$ coincident with the port $t'$, as shown in the drawings, which directs the pressure from the main reservoir through the indirect channel $q\,r$ to the train-pipe and thus maintains the equilibrium. The size of the passage $p'$ and resilient quality of the spring $o$ are such that the passage of air from the main reservoir to overcome any reduction of pressure due to slight leakage in the system will not effect closure of the valve $p$. In the event of a sudden exhausting of the pressure in the train-pipe, however, the force of the rush of air from the main reservoir will press the valve $p$ against the resistance of the spring to its seat, and thus close the passage $p'$ to prevent any further escape of air from the main reservoir. When the damage to the system which occasioned the sudden exhaust has been repaired, the plug may be turned again to bring the passage $s'$ coincident with the port $t^2$ and the pressure for releasing the brakes again established without material loss of time. When it is desired to reduce the air-pressure in the system to apply the brakes, the plug is turned to bring the branch passage $s^2$ coincident with the port $t^2$, which closes the ports $t$ and $t'$ and brings the passage $s'$ coincident with the port $t^3$. A passage is thus opened from the brake-pipe to the outer air. Upon the shell of the brake-valve should be indicated, in any suitable manner, the distances to which the handle is to be turned to move the plug to any of the positions described, and a spring $l'$ may be provided upon the handle to engage notches in the shell to hold the handle in any one of the positions desired.

While the valves above specifically described are the ones I prefer to employ, they are subject to modifications in the matter of details of construction and exact relative location, and I do not for that reason confine my invention to the particular construction set forth.

What I claim as new, and desire to secure by Letters Patent, is—

1. The combination, in an engineer's brake-valve device, of a main air-passage and supplemental air-passage between the main reservoir and train-pipe, an engineer's valve between the main reservoir and train-pipe, operative at will to direct the air-pressure through either the main passage or supplemental passage, and an auxiliary valve in the supplemental passage, operating by abnormal reduction of back-pressure in the train-pipe to shut off communication between the latter and the main reservoir through the supplemental passage, the said auxiliary valve forming the sole obstruction in the said supplemental passage, whereby it is exposed to back-pressure from the train-pipe, substantially as and for the purpose set forth.

2. The combination, in an engineer's brake-valve device, of a main air-passage and a supplemental air-passage, both leading to the train-pipe, a passage $A'$, leading from the main reservoir, an engineer's valve operative at will to direct the air-pressure from the passage $A'$ to either the said main or supplemental passage, and an auxiliary valve in the supplemental passage, operating by abnormal reduction of back-pressure in the train-pipe to shut off communication between the latter and the main reservoir through the supplemental passage, the said auxiliary valve forming the sole obstruction in the said supplemental passage, whereby it is permanently exposed to back-pressure from the train-pipe, substantially as and for the purpose set forth.

3. An engineer's brake-valve device having the inlet $t$ from the main reservoir $A$, outlet-passage $h$, and supplemental outlet-passage $q$, which communicate with the train-pipe $C$, an engineer's valve in the valve device, operating to direct the air-pressure from the inlet $t$ to either of said outlet-passages and when leading to the passage $q$ to close the passage $h$, and an auxiliary valve in the passage $q$, forming the sole obstruction in that passage and operating by abnormal reduction of back-pressure in the train-pipe to shut off communication between the latter and the main air-reservoir through the passage $q$, substantially as described.

4. An engineer's brake-valve device having the inlet $t$ from the main reservoir $A$, outlet-passage $h$, supplemental outlet-passage $q$, both of which lead to the train-pipe $C$, and an exhaust-opening $t^3$, an engineer's valve in the valve device, affording at will communication between the inlet $t$ and either passage $h$ or $q$ or between the passage $h$ and exhaust-opening $t^3$, and an auxiliary valve in the passage $q$, forming the sole obstruction in that passage and operating by abnormal reduction of back-pressure in the train-pipe to shut off communication between the latter and the main reservoir through the passage $q$, substantially as described.

5. In an engineer's brake-valve device, the combination of the engineer's valve $B'$, provided with the inlet $t$ from the main reservoir $A$, outlet-passages $h\,q$, leading to the train-pipe, exhaust-opening $t^3$, and plug $s$, having the diagonal passage $s'$ and branch passage $s^2$, and a valve device $B^2$, through which the passage $q$ extends, having a valve-seat $q'$ and a piston-valve $p$ in the said passage, the valve being mounted upon a stem $p^2$ and having a small opening $p'$ through it near its edge, a spring $o$, operating normally to maintain the valve $p$ away from its seat, and guides $n\,n'$ for the opposite ends of the stem $p^2$, whereby when the passage $s'$ is coincident with the passage $q$ abnormal reduction of back-pressure in the train-pipe will cause the valve $p$ to be closed and shut off the escape of air from the main reservoir through the passage $q$, substantially as described.

HARRY R. MASON.

In presence of—
J. W. DYRENFORTH,
M. J. FROST.